United States Patent
Matsuyama et al.

(10) Patent No.: US 6,880,391 B2
(45) Date of Patent: Apr. 19, 2005

(54) MEASURING INSTRUMENT OF THE PRESSURE IN A COMBUSTOR

(75) Inventors: Keisuke Matsuyama, Takasago (JP); Katsunori Tanaka, Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 28 days.

(21) Appl. No.: 10/214,204

(22) Filed: Aug. 8, 2002

(65) Prior Publication Data

US 2003/0051553 A1 Mar. 20, 2003

(30) Foreign Application Priority Data

Aug. 27, 2001 (JP) ........................................ 2001-256765

(51) Int. Cl.$^7$ ............................................. G01M 15/00
(52) U.S. Cl. ........................................................ 73/115
(58) Field of Search ........................... 73/112, 115, 116, 73/117.2, 117.3, 118.1

(56) References Cited

U.S. PATENT DOCUMENTS

| | | | | |
|---|---|---|---|---|
| 5,146,083 A | * | 9/1992 | Zuckerwar et al. | .... 250/227.21 |
| 5,488,868 A | * | 2/1996 | Ootake et al. | ................ 73/708 |
| 5,612,497 A | * | 3/1997 | Walter et al. | ................. 73/756 |
| 6,053,048 A | * | 4/2000 | Keller | .......................... 73/707 |
| 2003/0014219 A1 | * | 1/2003 | Shimizu et al. | ............. 702/184 |
| 2003/0093999 A1 | * | 5/2003 | Gleeson et al. | ............... 60/772 |

FOREIGN PATENT DOCUMENTS

| | | |
|---|---|---|
| GB | 2 037 993 | 7/1980 |
| JP | 6-331146 | 11/1994 |

* cited by examiner

Primary Examiner—Eric S. McCall
(74) Attorney, Agent, or Firm—Oblon, Spivak, McClelland, Maier & Neustadt, P.C.

(57) ABSTRACT

An instrument for measuring the pressure in a combustor having a pressure conduit inserted into the combustor, a pressure sensor for measuring the pressure in the combustor provided at a base end side of the pressure conduit, and a damping tube for absorbing a resonance produced in the pressure conduit in accordance with an acoustic eigenvalue of the pressure conduit. The damping tube is provided at the base end side of the conduit, in which the pressure sensor is located at a position where a temperature is elevated by heat from the combustor to a temperature equal to or above a boiling point of water at a concerned gas pressure. The damping tube is wound around the pressure sensor or pressure conduit (including the outer and inner surface of the conduit), and furthermore, heat-resisting, sound-absorbing material is provided in the pressure conduit.

18 Claims, 5 Drawing Sheets

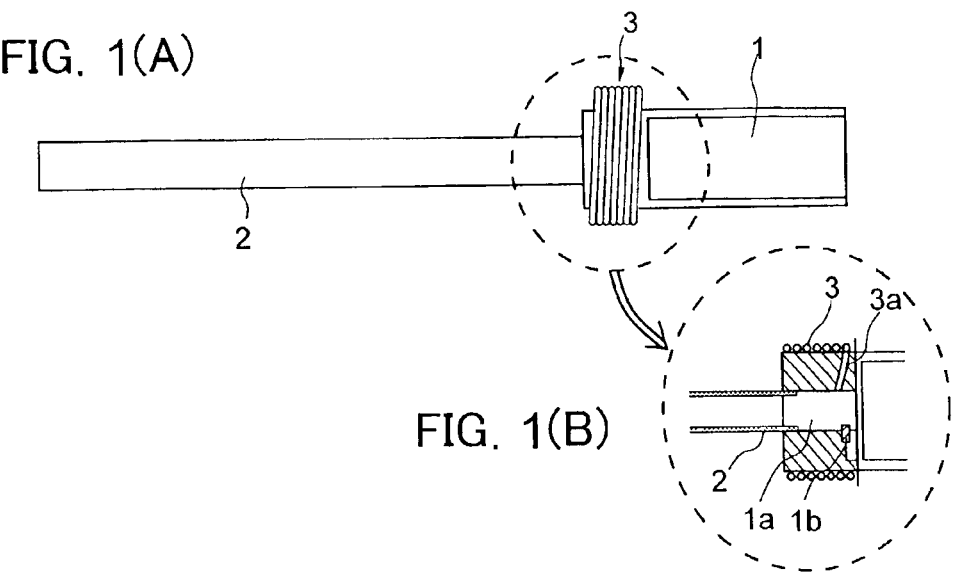
FIG. 1(A)
FIG. 1(B)
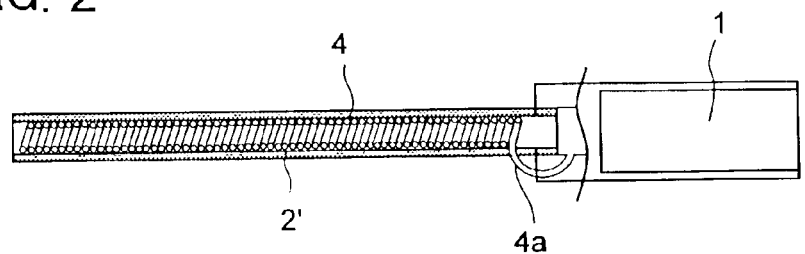
FIG. 2
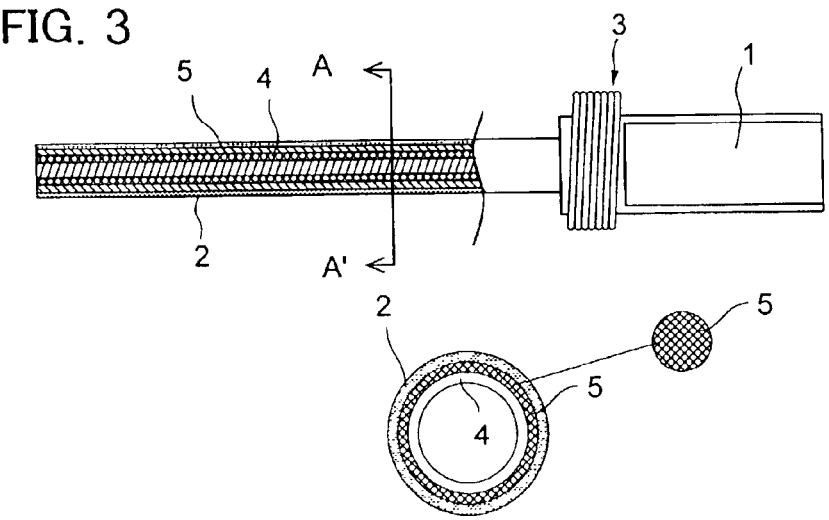
FIG. 3

PRIOR ART

MEASURING INSTRUMENT OF THE PRESSURE IN A COMBUSTOR

BACKGROUND OF THE INVENTION

1. Field of the Invention

The present invention relates to a measuring instrument of the pressure in a combustor of a gas turbine, rocket engine, etc.

2. Description of the Related Art

A gas turbine or rocket engine is equipped with a combustor. FIG. 7 shows, for example, a sectional view near the combustor of a gas turbine equipped with a combustor 11 to the rotor housing 12. In the drawing, the combustor 11 comprises a fuel nozzle 13, liner 14, and tail tube 15 inside a combustor casing 16. A bypass elbow 17 is connected to the tail tube 15 to which a bypass valve 18 with an adjusting mechanism 19 is attached. Reference number 20 is an air compressor. The air 21 compressed by the compressor 20 flows into the rotor housing 12, proceeds along the outer side of the combustor 11, and is introduced into the combustor 11 from the upstream side of the fuel nozzle 13 as shown by arrows. The fuel injected from the fuel nozzle 13 is burned in the combustor 11, and the combustion gas is introduced to the a gas turbine 22 to drive the turbine rotor.

In the combustor 11 of a gas turbine is produced resonant vibrations of the combustion gas, which are reflected from the components of the combustor 11 such as the liner 14, tail tube 15, and combustor casing 16, etc. The large energy of the resonant vibrations may cause the fatigue failure of the components of the combustor 11 and further the breakage of peripheral parts such as turbine blade, etc. To deal with the problem, the pressure fluctuation of the combustion gas is detected and fuel/air ratio, pilot ratio, the opening of the bypass valve, etc. are adjusted on the basis of the result of the detection.

The pressure in the combustor of a gas turbine or rocket engine is desirable to be measured directly by a pressure sensor located in the combustor, but in that case the pressure sensor directly contacts with the combustion gas of high temperature. A pressure sensor which can withstand such high temperatures is expensive, and also there is a possibility that failed detection of the pressure may occur due to the breakdown of the pressure sensor. If the pressure detection becomes impossible, it causes interference with the operation of the combustor of the gas turbine or rocket engine.

For this reason, a method was proposed to allow the use of an inexpensive pressure sensor, in which the pressure sensor 1 is prevented from being exposed to elevated temperatures by attaching a pressure conduit 2 to the pressure sensor 1 as shown in FIG. 8, inserting the pressure conduit 2 inside the liner 14 through the combustor casing 16 in FIG. 7, thus securing a certain distance between the combustion gas in the liner 14 and the pressure sensor 1.

However, with the pressure conduit 2 inserted into the inside of the liner 14, resonance occurs in the gas column in the pressure conduit 2 in accordance with the eigenvalue of the pressure conduit 2, as a result vibrations not existing in the combustor are created in the pressure conduit 2, the vibration being magnified by the response magnification of the pressure conduit, and the sensor 1 detects a pressure different from that in the liner 14.

To deal with this problem, there was proposed a pressure measuring instrument in Japanese Patent Application Publication No. 6-331146 as shown in FIG. 9, in which a damping tube 9 is provided so that resonance produced in the pressure conduit 2 in accordance with the eigenvalue of the pressure conduit 2 are absorbed and dampened by the damping tube 9 and gas pressure vibration detected is covered with flat amplitudes over the gas vibration frequencies to make it possible for the sensor 1 to accurately measure the pressure.

However, as the damping tube 9 shown in FIG. 9 is located at the position where the temperature is comparatively low (100° C. or below), there used to be such a case that, for example, when the operation is halted and started again after a while, condensation of water occurs in the damping tube 9 and accurate pressure measurement becomes impossible.

SUMMARY OF THE INVENTION

The problem to be tackled is, in a measuring instrument of the pressure in a combustor, the instrument having a pressure conduit, a damping tube, and a pressure sensor which is provided at some distance from the combustion gas in the combustor by the use of the pressure conduit, and being composed so that the resonance of gas column in the pressure conduit produced in accordance with the acoustic eigenvalue of the pressure conduit is prevented by the damping tube, to prevent condensation of water in the damping tube and make it possible to always accurately measure the pressure in the combustor.

To resolve the problem mentioned above, the present invention proposes a measuring instrument of the pressure in a combustor, the instrument having a pressure conduit inserted into the combustor, a pressure sensor mounted to the base end side of the pressure conduit for measuring by way of the pressure conduit the gas pressure in the combustor, and a damping tube mounted to the base end side of the pressure conduit for absorbing the resonance produced in accordance with the acoustic eigenvalue of the pressure conduit, wherein said pressure sensor is located at the position where the temperature is elevated by the heat from the combustor to equal to or above that of the boiling point of water at the pressure of the gas from the combustor, and said damping tube is provided extending around or in the direction of axis of at least one of said pressure sensor or pressure conduit contacting with the surface thereof to prevent condensation of moisture in the damping tube.

The composition like this enables that the damping tube is wound around at least one of the pressure sensor or inside or outside of the pressure conduit or the pressure conduit is composed of a plurality of narrow tubes bundled together and inserted therein so that condensation of the moisture in the damping tube or tubes is prevented.

With this composition, condensation of water in the damping tube is prevented because the damping tube is maintained at a temperature equal to or above the boiling point of water at the pressure in the damping tube which is heated by the pressure sensor or the pressure conduit heated by receiving heat from the combustor, and accurate measurement of pressure is possible because the resonance produced in the pressure conduit in accordance with the acoustic eigenvalue of the pressure conduit is absorbed by the damping tube. Therefore, the condition that accurate measurement of the pressure in the combustor is impossible owing to the condensed water in the damping tube does not occur as did in the instrument of prior art, and the combustor of a gas turbine or rocket engine can be operated without interference.

It is suitable in a preferred embodiment of the present invention that said damping tube is wound inside the pressure conduit. In this case, it is suitable to compose the pressure conduit as a double-tube and wound the damping tube in the ring-shaped gap between the tubes.

As the damping tube is wound inside the pressure conduit where the temperature becomes higher, the moisture in the damping tube is perfectly evaporated and the possibility of condensation of moisture is further eliminated. Therefore, as the temperature in the damping tube is high at the time when the operation of the combustor is stopped, the moisture in the damping tube has been evaporated before the temperature therein lowers during the halt of operation to a temperature below the boiling point of water at the pressure in the damping tube. So the possibility of the occurrence of condensation of the moisture in the damping tube at the restart of operation is eliminated. Therefore, the condition that accurate measurement of the pressure in the combustor is possible because the condensed water in the damping tube does not occur, and the resonance produced in accordance with the acoustic eigenvalue of the pressure conduit is absorbed by the damping tube, so accurate measurement of pressure is always possible.

To further enhance the sound-absorbing effect, it is preferable that a heat-resisting, sound-absorbing material is provided inside said pressure conduit to absorb the resonance produced in the pressure conduit in accordance with the acoustic eigenvalue of the pressure conduit.

By providing a heat-resisting, sound-absorbing material inside the pressure conduit, the resonance produced in the pressure conduit in accordance with the acoustic eigenvalue of the pressure conduit can be absorbed to some extent. By further absorbing the resonance produced in the pressure conduit in accordance with the eigenvalue of the pressure conduit by the damping tube, the problem due to the resonance produced in accordance with the eigenvalue of the pressure conduit can be resolved.

According to the invention, by providing a plurality of heat-resisting, sound-absorbing materials each of which absorbs different frequency level, the resonance produced in the pressure conduit in accordance with the acoustic eigenvalue of the pressure conduit is absorbed in a wide range of frequency resulting in an enhanced effect of absorbing the resonance in the pressure conduit.

Further, it is suitable that a drain valve is provided to the damping tube to make it possible to drain the water condensed in the damping tube.

By providing a drain valve to the damping tube, even if water is condensed in the damping tube, it can be easily drained. As the combustion gas flows through the damping tube when the condensed water is drained, water does not accumulate in the damping tube.

Further, it is suitable in the pressure measuring instrument having a pressure conduit inserted into the combustor, and a pressure sensor mounted to the base end side of the pressure conduit for measuring by way of the pressure conduit the gas pressure in the combuster, that said pressure conduit is composed of a plurality of narrow tubes bundled together to form a multi-tube pressure conduit for allowing the pressure conduit itself to have a damping effect.

By composing the pressure conduit itself as a multi-tube pressure conduit having a bundle of narrow pressure conduits like this, the acoustic eigenvalues themselves of the pressure conduit is distributed over the narrow pressure conduits, resonance frequencies are shifted, and the pressure measurement is possible while maintaining the energy gain by the pressure conduit to a certain level, which enables more accurate pressure measurement.

So, more accurate measurement of the pressure is possible.

BRIEF DESCRIPTION OF THE DRAWINGS

FIG. 1 is a schematic representation of the first embodiment of the pressure measuring instrument according to the present invention.

FIG. 2 is a schematic representation of the second embodiment of the pressure measuring instrument according to the present invention.

FIG. 3 is a schematic representation of the third embodiment of the pressure measuring instrument according to the present invention.

DETAILED DESCRIPTION OF THE PREFERRED EMBODIMENTS

Figure 4:
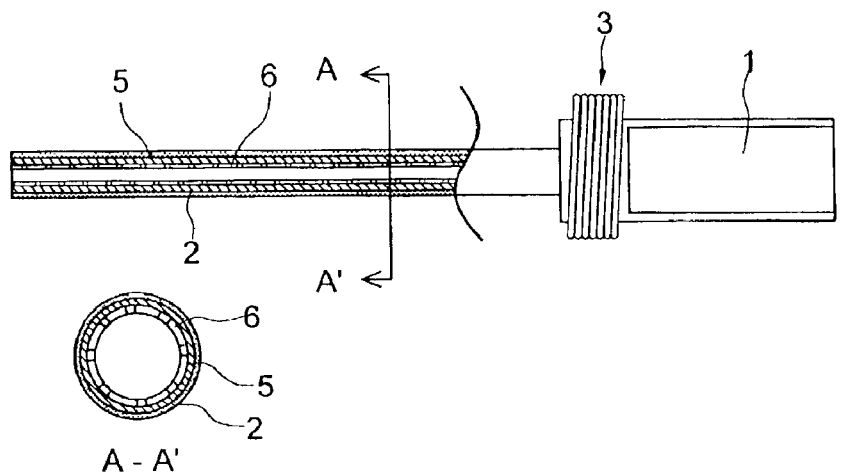
FIG. 4 is a schematic representation of the fourth embodiment of the pressure measuring instrument according to the present invention.

A preferred embodiment of the present invention will now be detailed exemplarily with reference to the accompanying drawings. It is intended, however, that unless particularly specified, dimensions, materials, relative positions and so forth of the constituent parts in the embodiments shall be interpreted as illustrative only not as limitative of the scope of the present invention.

FIG. 1 to FIG. 6 are schematic representations of a first to sixth embodiment of the pressure measuring instrument according to the present invention. In the drawings, reference numeral 1 is a pressure sensor, 2 is a pressure conduit, 3 is a damping tube, 4 is a damping tube wound in pressure conduit 2, 5 is a heat-resisting, sound-absorbing material, 6 is a heat-resisting, sound-absorbing material having the property of absorbing frequency level different from that of material 5, 7 is a drain valve, and 8 is a multi-tube pressure conduit composed of narrow tubes bundled together.

When the pressure sensor 1 is attached at the end of the pressure conduit 2, the detected pressure fluctuation may be entirely different from that in the combustor of a gas turbine, if the frequency f of the pressure fluctuation in the combustor of the gas turbine is between the resonance frequencies of the gas column in the conduit or near them. When the damping tube is connected to the conduit 2, the detected pressure fluctuation has a flat frequency characteristic in a part of the frequency range. Therefore, the pressure conduit 2 and damping tube 4 are determined to have such a characteristic that the range of flat frequency characteristic covers over the combustion gas vibration frequencies.

Generally, such a characteristic is obtained with a damping tube 4 longer than the pressure conduit 2.

Figure 7:
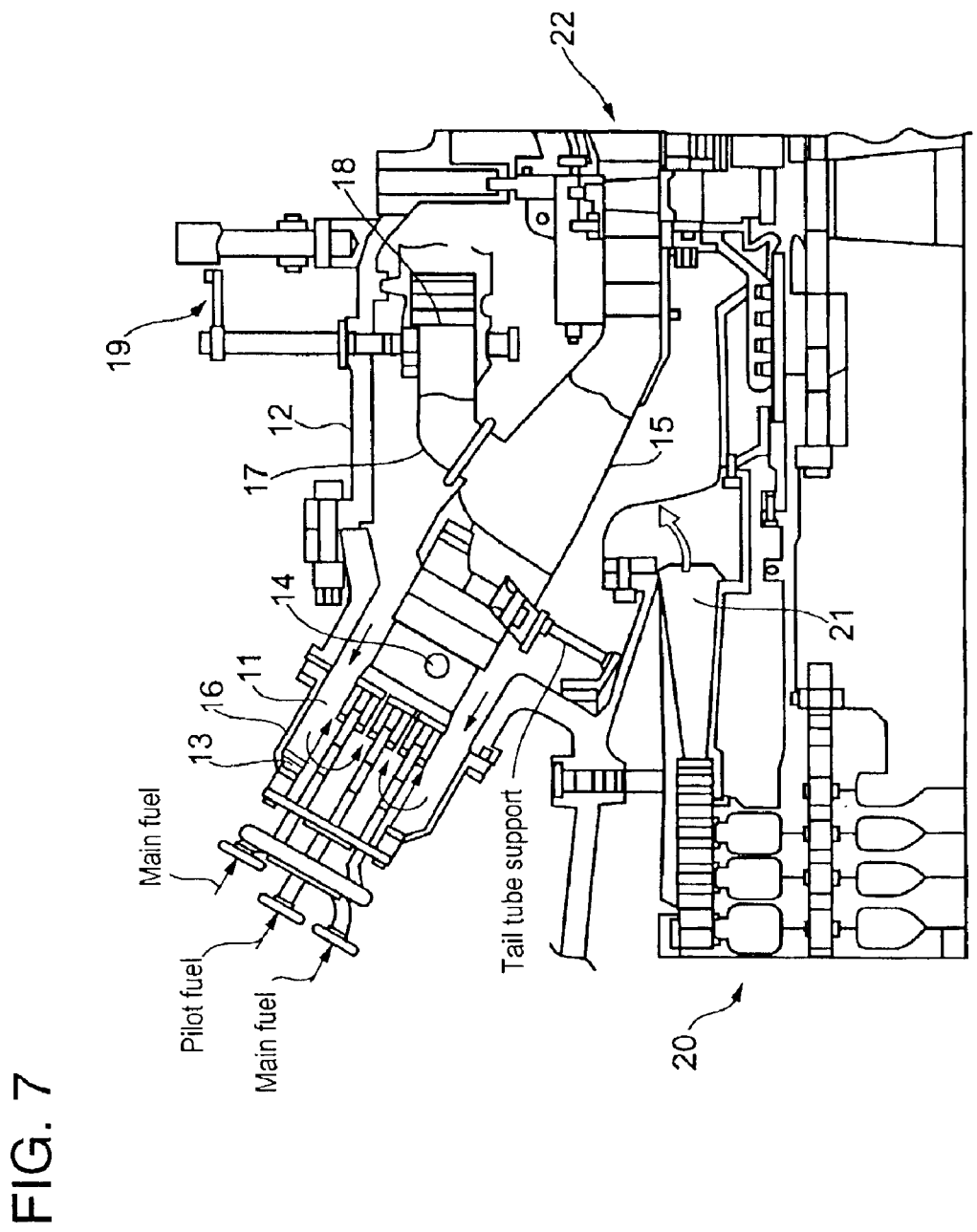
FIG. 7 is a sectional view near the combustor of a gas turbine.
Figure 8:
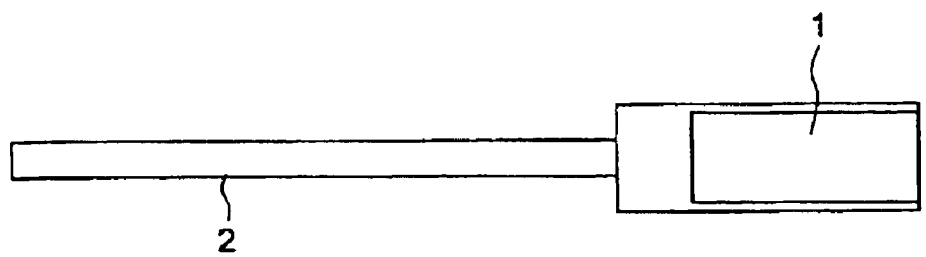
FIG. 8 is an illustration of a pressure measuring instrument of prior art in which the pressure sensor is arranged so that it is positioned distantly from the combustion gas in a combustor through the use of a pressure conduit.
Figure 9:
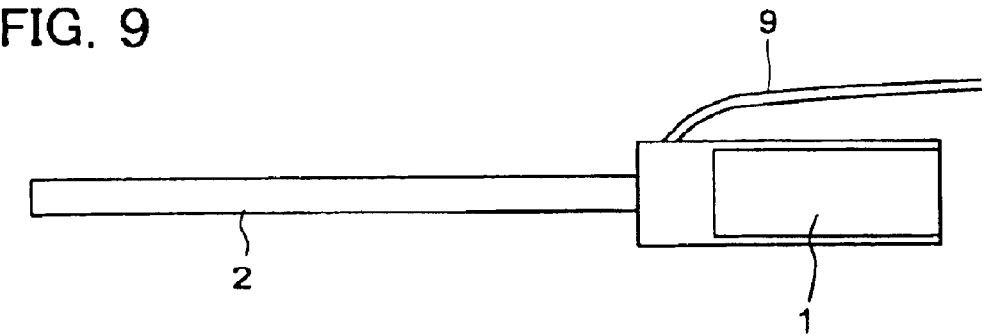
FIG. 9 is an illustration of a pressure measuring instrument of prior art in which the resonance of gas column in the pressure conduit is prevented through the use of a damping tube.

FIG. 1 is a schematic representation of the first embodiment of the pressure measuring instrument according to the present invention. As shown in FIG. 1(A), a pressure sensor 1 is provided at the base end part of a straight pressure conduit 2. The other end part of the pressure conduit 2 is inserted through the combustor casing 16 and liner 14 of the combustor 11 of a gas turbine into the combustion chamber as shown in FIG. 7.

The end part 3a of a damping tube 3 made of a flexible, narrow tube is attached so that it communicates with the inner space 1a in which a pressure sensor body 1b is located, the length of the damping tube 3 being adjusted so that such a characteristic is obtained that the range of flat frequency characteristic covers over the combustion gas vibration frequencies, and the damping tube 3 is wound around the pressure sensor 1. The length of the pressure conduit 2 is determined so that the pressure sensor 1 is located at the position where the temperature is elevated to equal to or above the boiling point of water (for instance, 100° C.) at the concerned gas pressure by the heat from the combustor 11.

Therefore, the possibility of the occurrence of condensation of water in the damping tube 3 is eliminated. To be more specific, the temperature near the pressure sensor 1 is heated to a temperature equal to or above the boiling point of water at the pressure in the damping tube 3 after a while from the start of operation of the combustor 11 of, for example, a gas turbine or rocket engine, and the damping tube 3 is also heated to a temperature equal to or above the boiling point of water at the pressure in the tube 3, so the possibility of the occurrence of condensation of the moisture in the damping tube 3 is eliminated.

The temperature in the damping tube 3 is high at the time when the operation of the combustor 11 is stopped. When the operation is started again, the moisture in the tube 3 has been evaporated before the temperature therein lowers during the halt of operation to a temperature below the boiling point of water at the pressure in the tube 3, so the possibility of the occurrence of condensation of the moisture in the damping tube 3 at the restart of operation is eliminated.

Therefore, failed measurement due to the condensation of the moisture in the damping tube 3 does not occur, and accurate pressure measurement is always possible, as the resonance produced in accordance with the acoustic eigenvalue of the pressure conduit 2 can be absorbed by the damping tube 3.

FIG. 2 is a schematic representation of the second embodiment of the pressure measuring instrument according to the present invention. In this second embodiment, a damping tube 4 is wound inside a pressure conduit 2' along the inner surface thereof and the free end 4a thereof is provided so as to communicate with the inner space where the pressure sensor body 1b is provided as shown in FIG. 1, and the length of the damping tube 3, 4 is adjusted so that a flat detection characteristic range of frequency covers the combustion vibration frequency. That the pressure conduit 2 and the pressure sensor 1 are located at the position where the temperature is elevated to equal to or above the boiling point of water at the concerned gas pressure by the heat from the combustor 11, is the same as is in the first embodiment.

As the damping tube 4 is wound inside the pressure conduit 2' along the inner surface thereof where the temperature becomes higher than the temperature of where the damping tube 4 is wound in the first embodiment, the moisture in the damping tube 4 is perfectly evaporated and the possibility of the condensation is eliminated more perfectly.

Therefore, if the operation of the combustor 11 is stopped after some time of operation, the water in the tube 4 is evaporated owing to the elevated temperature in the damping tube before the temperature therein lowers to a temperature below the boiling point of water at the pressure in the tube, so the possibility of the occurrence of condensation of water in the damping tube 4 at the restart of the operation of the combustor 11 is eliminated as is the case with the first embodiment. Accordingly, failed measurement due to the condensation of water in the damping tube 4 does not occur, and accurate pressure measurement is always possible, as the resonance produced in accordance with the acoustic eigenvalue of the pressure conduit 2' can be absorbed by the damping tube 4.

FIG. 3 is a schematic representation of the third embodiment of the pressure measuring instrument according to the present invention. In this third embodiment, a damping tube 3 is wound around the pressure sensor 1 the same as in the case with the first embodiment and at the same time it is wound inside the pressure conduit 2 as in the case with the second embodiment, and further a heat-resisting, sound-absorbing material 5 is provided along the inner surface of the pressure conduit 2 as shown in section A–A' of FIG. 3. A heat-resisting sintered metal net is used as the heat-resisting, sound-absorbing material 5, for example. That the pressure sensor 1 is located at the position where the temperature is elevated to equal to or above the boiling point of water at the concerned pressure by the heat from the combustor 11, is the same as is the case with the first embodiment.

By attaching the heat-resisting, sound-absorbing material 5 inside the pressure conduit 2, the resonance produced in the pressure conduit 2 in accordance with the acoustic eigenvalue of the pressure conduit is absorbed to some extent in the pressure conduit, and further the resonance produced in the pressure conduit 2 in accordance with the acoustic eigenvalue of the pressure conduit is absorbed by the damping tube 3. As a result, the problem due to the resonance produced in accordance with the acoustic eigenvalue of the pressure conduit can be resolved. As the damping tube 3 is wound around the region where the temperature is higher than the boiling point of water at the pressure in the damping tube, the possibility of the condensation of water is eliminated.

FIG. 4 is a schematic representation of the fourth embodiment of the pressure measuring instrument according to the present invention. In this fourth embodiment, the damping tube 3 is wound around the pressure sensor 1 as is with case of the first embodiment, and at the same time a heat-resisting, sound-absorbing material 6 is attached along the inner surface of a pressure conduit 2 in addition to the heat-resisting, sound-absorbing material 5 in the case of the third embodiment, as shown in section A–A' of FIG. 4, the heat-resisting, sound-absorbing material 6 being composed of, for example, a plate with a number of holes (punched metal, etc.) having the property of absorbing frequency level different from that absorbed by the heat-resisting, sound-absorbing material 5.

The heat-resisting, sound-absorbing material 5 composed of a sintered metal net is effective to absorb low frequency vibration, and the heat-resisting, sound-absorbing material 6 composed of a plate with a number of holes such as punched metal is effective to absorb high frequency vibration.

Therefore, by using both materials, the resonance produced in accordance with the acoustic eigenvalue of the pressure conduit 2 can be absorbed in a wide range of frequencies, thus the damping effect can be enhanced.

Figure 5:
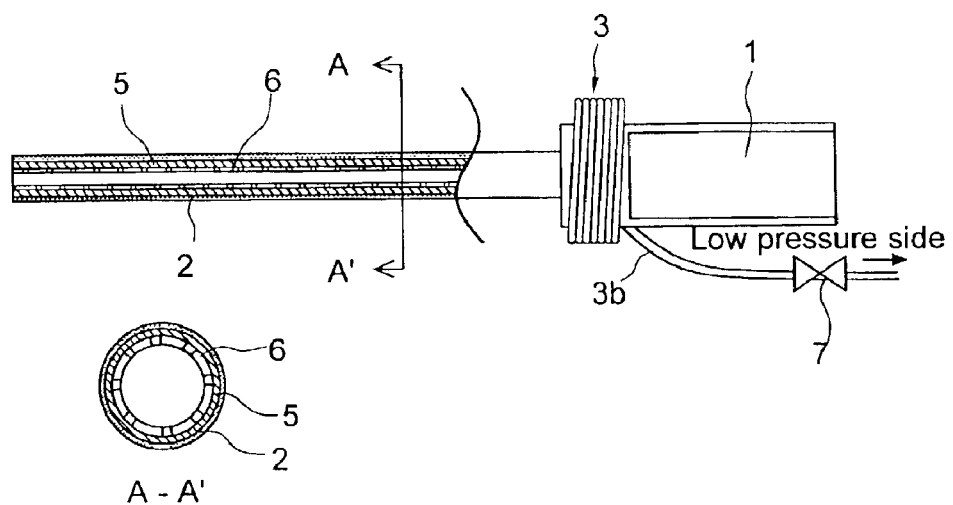
FIG. 5 is a schematic representation of the fifth embodiment of the pressure measuring instrument according to the present invention.

FIG. 5 is a schematic representation of the fifth embodiment of the pressure measuring instrument according to the present invention. In this fifth embodiment, a drain valve 7 is provided at the free end 3b of a damping tube 3 wound around a pressure sensor 1 for letting out the condensed water in the damping tube 3. Other than this point, its composition is the same as those of the first to fourth embodiments mentioned above. It is suitable to compose so that, for example, the damping tube 3 is wound around the base end part for providing the pressure sensor 1 or around the pressure conduit 2 in a manner similar to that in the first embodiment, or wound inside the pressure conduit 2 in a manner similar to that in the second embodiment, and the heat-resisting, sound-absorbing material 5 and heat-resisting, sound-absorbing material 6 having the property of absorbing frequency level different from that absorbed by the heat-resisting, sound-absorbing material 5 as in the case with the third or fourth embodiment as shown in section A–A' of FIG. 5.

By providing the drain valve 7 to the damping tube 3, even if water is condensed in the damping tube 3, it can be easily drained. The other side opposite to the free end 3b where the drain valve 7 is connected, is communicated with the inner space which communicates with the pressure conduit 2 and where the pressure sensor 1 located, so the combustion gas flows through the damping tube 3, the condensed water therein is ejected by the gas flow from the drain valve 7, and water does not accumulate in the damping tube 3.

Figure 6:
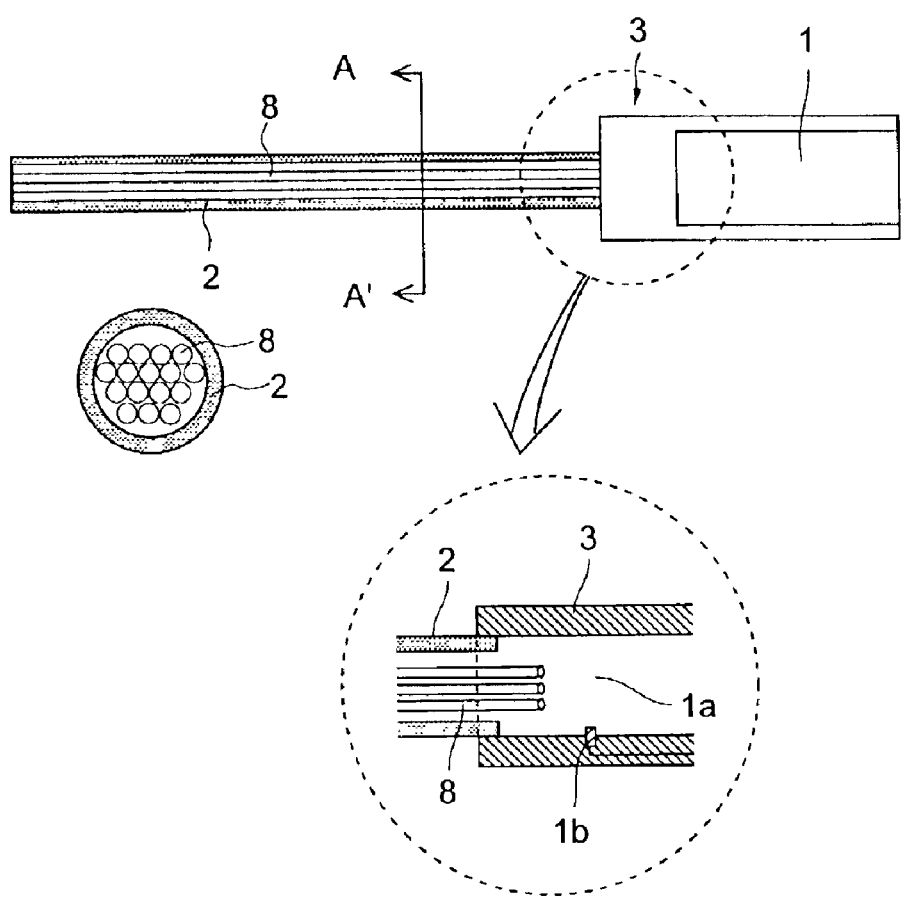
FIG. 6 is a schematic representation of the sixth embodiment of the pressure measuring instrument according to the present invention.

FIG. 6 is a schematic representation of the sixth embodiment of the pressure measuring instrument according to the present invention. In this sixth embodiment, a pressure conduit 2 is composed of a plurality of narrow damping tubes 8 bundled together, allowing the pressure conduit 2 itself to have a damping effect. With this composition of the pressure conduit 2, the acoustic eigenvalues themselves of the pressure conduit 2 is distributed over the narrow damping tubes, resonance frequencies are shifted, a damping effect is obtained, and the energy gain by the pressure conduit is maintained to a certain level. The end of said bundle of damping tubes 8 is located so as to communicate with the inner space 1a where the pressure sensor body 1b is provided as shown in the enlarged local section surrounded by a circle. The pressure sensor 1 is located at a position where the temperature is elevated by the heat from the combustor 11 to equal to or higher than that of the boiling point of water at the concerned gas pressure.

With this composition, the measurement of pressure by the pressure sensor 1 is possible while maintaining a certain level of the energy gain by the pressure conduit 2, and at the same time the acoustic eigenvalues themselves of the pressure conduit 2 is distributed over the narrow damping tubes 8 to be reduced to small values, and accurate measurement of pressure is possible. As damping effect can be obtained in the narrow pressure conduits, more accurate measurement of gas pressure is possible.

Although not shown in the drawing, it is also suitable that the pressure conduit 2 is composed of narrow pressure tubes bundled together as shown in Section A—A of FIG. 6 to allow the pressure conduit itself to have a damping effect. By composing the pressure conduit like this, the eigenvalue of the pressure conduit 2 is distributed over the narrow conduits, resonance frequencies is shifted resulting in enhanced damping effect, and the energy gain is able to be maintained to a certain level.

As has been described in the foregoing, according to the present invention, the temperature of the damping tube is maintained to the temperature equal to or above the boiling point of water at the pressure in the tube by the base end part for providing the pressure sensor 1 or the pressure conduit where the temperature is elevated to equal to or above the boiling point of water at the concerned gas pressure by always receiving heat from the combustor during operation, so condensation of water in the tube is prevented. The damping tube absorbs the resonance produced in accordance with the acoustic eigenvalue of the pressure conduit, so accurate measurement of pressure is always possible. Therefore, the condition that accurate measurement of the pressure in the combustor is impossible because the condensed water in the damping tube does not occur as did in the instrument of prior art, and the combustor of a gas turbine or rocket engine can be operated without interference.

Further, according to the present invention, the damping tube is wound inside the pressure conduit of which the temperature is elevated during operation, so the moisture in the damping tube is perfectly evaporated resulting in no possibility of condensation of water. Therefore, if the operation of the combustor is halted after some time of operation, the temperature of the damping tube is elevated when the operation is stopped, so the moisture in the damping tube is evaporated before the temperature in the tube lowers to below the boiling point of water at the pressure in the tube, thus the possibility of condensation of water at restart of operation is eliminated. Therefore, the condition that accurate measurement of the pressure in the combustor is impossible due to the condensed water in the damping tube does not occur, and the resonance produced in accordance with the acoustic eigenvalue of the pressure conduit is absorbed by the damping tube, so accurate measurement of pressure is always possible.

Further, according to the present invention, the resonance produced in the pressure conduit in accordance with the eigenvalue of the pressure conduit is absorbed to some extent in the pressure conduit by providing heat-resisting, sound-absorbing material in the pressure conduit, and by further absorbing by the damping tube the resonance produced in the pressure conduit in accordance with the eigenvalue of the pressure conduit, the problem due to the resonance produced in accordance with the eigenvalue of the pressure conduit can be resolved.

Further, according to the present invention, by the use of a plurality of sound-absorbing materials each having the property of absorbing different frequency level, the resonance produced in accordance with the eigenvalue of the pressure conduit can be absorbed in a wide range of frequency resulting in enhanced damping effect.

Further, according to the present invention, by providing a drain valve to the damping tube, even if water is condensed in the damping tube 3, it can be easily drained. The combustion gas flows through the damping tube 3 when the condensed water is drained, so water does not accumulate in the damping tube 3.

Further, according to the present invention, by composing the pressure conduit with a plurality of narrow pressure conduits bundled together, the acoustic eigenvalues themselves of the pressure conduit is distributed over the narrow pressure conduits, resonance frequencies are shifted, and even more accurate pressure measurement is possible while maintaining the energy gain by the pressure conduit to a certain level, which enables more accurate pressure measurement.

What is claimed:

1. A measuring instrument of a gas pressure in a combustor, the instrument comprising a pressure conduit inserted into the combustor, a pressure sensor mounted to a base end side of the pressure conduit for measuring by way of the pressure conduit the gas pressure in the combustor, and a damping tube mounted to the base end side of the pressure conduit for absorbing a resonance produced in accordance with an acoustic eigenvalue of the pressure conduit, wherein an end of said pressure conduit is adapted to be inserted into the combustor to measure the gas pressure in the combustor by way of the pressure conduit, and the damping tube including a flexible, narrow tube is attached so an end thereof communicates with an inner space in which a pressure sensor body is located to prevent condensation of moisture in the damping tube.

2. A measuring instrument of the pressure in a combustor according to claim 1, wherein said damping tube is wound along an inner circumference inside the pressure conduit.

3. A measuring instrument of the pressure in a combustor according to claim 1 or 2, wherein a sound-absorbing material is provided on an outer circumference of the damping tube wound inside the pressure conduit for absorbing the resonance produced in accordance with the acoustic eigenvalue of the pressure conduit.

4. A measuring instrument of the pressure in a combustor according to claim 1, wherein a plurality of sound-absorbing materials each having the property of absorbing different frequency level are provided in the pressure conduit for absorbing the resonance produced in accordance with the acoustic eigenvalue of the pressure conduit.

5. A measuring instrument of the pressure in a combustor according to claim 1, wherein a drain valve is provided at a free end of the damping tube, the drain valve being configured to drain water condensed in the damping tube.

6. A measuring instrument of the pressure in a combustor according to claim 1, wherein said damping tube is composed of a plurality of narrow tubes bundled together and inserted into the pressure conduit.

7. A combustor pressure measurement device, comprising:

a pressure conduit including a first end and a second end, the first end adapted to be inserted into the combustor;

a pressure sensor mounted to a second end of the pressure conduit, the pressure sensor including a pressure sensor body provided in an inner space of the pressure sensor; and a damping tube including a flexible tube, a first end of the flexible tube in direct fluidic communication with the inner space, wherein the damping tube is configured to absorb a resonance produced in accordance with an acoustic eigenvalue of the pressure conduit.

8. The combustor pressure measurement device of claim 7, wherein the damping tube is provided to spiral along an inner circumference of the pressure conduit.

9. The combustor pressure measurement device of claim 7, wherein a sound-absorbing material is provided on an outer circumference of the damping tube, the material configured to absorb the resonance produced in accordance with the acoustic eigenvalue of the pressure conduit.

10. The combustor pressure measurement device of claim 7, wherein a plurality of sound-absorbing materials are provided in the pressure conduit for absorbing the resonance produced in accordance with the acoustic eigenvalue of the pressure conduit, the plurality of sound-absorbing materials configured to absorb at least two frequency levels.

11. The combustor pressure measurement device of claim 7, wherein a drain valve is provided at a free end of the damping tube, the drain valve being configured to drain water condensed in the damping tube.

12. The combustor pressure measurement device of claim 7, wherein the damping tube includes a plurality of narrow tubes bundled together and provided coaxially in the pressure conduit.

13. A combustor pressure measurement device, comprising:

a pressure conduit including a first end and a second end, the first end adapted to be inserted into the combustor;

a pressure sensor mounted to a second end of the pressure conduit, the pressure sensor including a pressure sensor body provided in an inner space of the pressure sensor; and damping means for absorbing a resonance produced in accordance with an acoustic eigenvalue of the pressure conduit, the damping means provided in direct fluidic communication with the inner space.

14. The combustor pressure measurement device of claim 13, wherein the damping means is provided to spiral along an inner circumference of the pressure conduit.

15. The combustor pressure measurement device of claim 13, wherein a sound-absorbing material is provided on an outer circumference of the damping means, the material configured to absorb the resonance produced in accordance with the acoustic eigenvalue of the pressure conduit.

16. The combustor pressure measurement device of claim 13, wherein a plurality of sound-absorbing materials are provided in the pressure conduit for absorbing the resonance produced in accordance with the acoustic eigenvalue of the pressure conduit, the plurality of sound-absorbing materials configured to absorb at least two frequency levels.

17. The combustor pressure measurement device of claim 13, wherein a drain valve is provided at a free end of the damping means, the drain valve being configured to drain water condensed in the damping means.

18. The combustor pressure measurement device of claim 1, wherein the damping means includes a plurality of narrow tubes bundled together and provided coaxially in the pressure conduit.

* * * * *